US007487404B2

(12) United States Patent
Hsu et al.

(10) Patent No.: US 7,487,404 B2
(45) Date of Patent: Feb. 3, 2009

(54) FIRMWARE STRUCTURING METHOD AND RELATED APPARATUS FOR UNIFYING HANDLING OF EXECUTION RESPONSES OF SUBROUTINES

(75) Inventors: Han-Wen Hsu, Hsin-Chu (TW); Ming-Hsien Tsai, Kao-Hsiung (TW)

(73) Assignee: MediaTek Inc., Hsin-Chu Hsien (TW)

( * ) Notice: Subject to any disclaimer, the term of this patent is extended or adjusted under 35 U.S.C. 154(b) by 536 days.

(21) Appl. No.: 10/605,520

(22) Filed: Oct. 6, 2003

(65) Prior Publication Data

US 2004/0177340 A1 Sep. 9, 2004

(30) Foreign Application Priority Data

Mar. 7, 2003 (TW) ............................ 92105022 A

(51) Int. Cl.
*G06F 11/00* (2006.01)

(52) U.S. Cl. ........................................................ 714/48

(58) Field of Classification Search .................. 714/42, 714/44, 48, 54; 369/53.42

See application file for complete search history.

(56) References Cited

U.S. PATENT DOCUMENTS

| | | | | | |
|---|---|---|---|---|---|
| 5,596,716 | A * | 1/1997 | Byers et al. | ................... | 714/48 |
| 5,617,535 | A * | 4/1997 | Aizawa et al. | ................ | 714/46 |
| 5,740,357 | A * | 4/1998 | Gardiner et al. | ............... | 714/57 |
| 6,058,494 | A * | 5/2000 | Gold et al. | ..................... | 714/42 |
| 6,530,034 | B1 * | 3/2003 | Okada et al. | ................... | 714/5 |
| 6,785,212 | B1 * | 8/2004 | Sim et al. | ................ | 369/59.22 |
| 6,862,688 | B2 * | 3/2005 | Ochiai | ........................... | 714/2 |
| 2003/0165099 | A1 * | 9/2003 | Watt et al | .................. | 369/53.3 |
| 2004/0030961 | A1 * | 2/2004 | Ma et al. | ...................... | 714/42 |

* cited by examiner

*Primary Examiner*—Yolanda L Wilson
(74) *Attorney, Agent, or Firm*—Winston Hsu

(57) ABSTRACT

A firmware code structuring method and related apparatus includes a plurality of subroutines to define various operations of the hardware circuit, and the subroutines are grouped in several different levels. A subroutine of a lower level defines a simpler operation of the hardware circuit, and a higher-level subroutine calls a plurality of lower level subroutines to define more complicated operations of the hardware circuit. When the lower level subroutines are executed, they store results of corresponding operations in an error code. If certain operations performed do not achieve expected results, a corresponding recovery operation is performed by the hardware circuit. To control the hardware to perform the required recovery operations, an error-handler is executed to make the hardware circuit perform recovery operations corresponding to lower level subroutines called in a higher level subroutine according to the error code after the higher level subroutine is finished.

26 Claims, 18 Drawing Sheets

```
#define ChkStatus(x)  x
#define SetStatus(x)    x = 1;
#define ClrStatus(x)    x = 0;

BYTE A01_1(...)
{
 ++_bLevel;
 ...
 /* Global status check */
 if (ChkStatus( _fgSelectB01_2))
 {
    if (B01_2(...)!= READY)
    {
     _bErrorCode[ _bLevel--] = B01_Err;
     return(!READY);
    }
 }
 else
 {
    if (B02_2(...) != READY)
    {
     _bErrorCode[ _bLevel--] = B02_Err;
     return(!READY);
    }
 ...
 }
 ...
 if (B03_2(...) != READY)
 {
  _bErrorCode[ _bLevel--] = B03_Err;
  return(!READY);
 }
 ...
 if (B04_2(...) != READY)
 {
  _bErrorCode[ _bLevel--] = B04_Err;
  return(!READY);
 }
 ...
 _bErrorCode[ _bLevel--] = READY;
 return(READY);
}
```

50A (brackets the global status check block, from `if (ChkStatus(...))` to its closing brace)

50B (brackets the `B03_2` check)

50C (brackets the `B04_2` check)

50D (brackets the final `READY` return)

Fig. 6

```
BYTE B01_2(...)
{
 ++_bLevel;
 ...
 if (C01_3(...) != READY)
 {
  _bErrorCode[_bLevel--]=C01_Err;
  ClrStatus(_fgSelectB01_2);
  return(!READY);
 }
 ...
 _bErrorCode[_bLevel--] = READY;
 return(READY);
}
```

50E — if (C01_3(...) != READY) { ... }

50F — _bErrorCode[_bLevel--] = READY; return(READY);

Fig. 7

```
BYTE C01_3(...)
{
  ...
  D01_4(...);
  ...
   SetStatus( _fgSelectB01_2);
  ...
}
```

Fig. 8

```
BYTE D01_4(...)
{
  ...
  E01_5(...);
  ...
  E02_5(...);
  ...
 }
```

Fig. 9

```
void ErrorHandler( )
{
  /* check if error occurs */
  if ( _ErrorCode[ _bLevel] != READY)
  {
    switch ( _bFunctionCode)
    {
      case A01:        // Function A01_1
          switch ( _bErrorCode[ _bLevel+1])
          {
            case READY:
                return;
            case B01_Err:
                switch ( _bErrorCode[ _bLevel+2])
                {
                  case READY:
                      return;
                  case C01_Err:    // error recovery for C01_Err
                      B07_2(...);
                      return;
                  ...
                  default:
                      return;
                }
            case B02_Err:
                ...
            case B03_Err:
                ...
            default:
                return;
          }
      case A02:        // Function A02_1
      ...
      default:
        return;
    }
  }
  }
}
```

```
#define ENTRY_LEVEL    0
#define MAX_ERR_CNT   3
#define RET(x)      {                                          \
                      _bErrorCode[ _bServoLevel--] = x ;  \
                      return;                              \
                    }
#define RET1(x)   {                                          \
                      _bErrorCode[ _bServoLevel--] = x ;  \
                      return(x);                           \
                    }
#define ChkStatus(x)  x
#define SetStatus(x)    x = 1;
#define ClrStatus(x)    x = 0;

//------------------------------------------------
void SRVFunction_0(BYTE bFuncName )
{

  _bServoLevel = ENTRY_LEVEL;
  _bErrCnt = 0;
  _bErrorCode[ _bServoLevel] = bFuncName;

  do
  {
   switch (bFuncName)
   {
    case START_UP:
         SRVStartUp_1( );
         break;

    case CD_Q_SEEK:
         SRVCDQSeek_1( );
         break;

    default:
         break;
   }
   ErrorHandler_0( );

  } while( _bErrorCode[0]!=EXIT_SRVFUNCTION);

}
```

```
void SRVStartUp_1( )
{
   _bServoLevel++;

  if (ChkStatus( _fgKEjtPressed ))  RET( TRAY_EJECT );

  if (!ChkStatus( _fgPowerOnInit ))
  {
   PowerOnCalibrate_3( );
   MoveSled_5(TO_INNER, MOVE_SLED_HOME);
  }

  CheckMotorStop_5( );
  ...
  if(!_fgATIP)
  {
   if( bReadQPosition_4( ) )  RET( bReadQPosition_Err );
  }
  else
  {
   if( bReadATIPPosition_4( ) )  RET( bReadATIPPosition_Err );
   if( bReadLeadin_2( ) )  RET( bReadLeadin_Err );
  }

  MediaOkInitSetting_5( );

  RET( READY );
}
```

52A (brace spanning the if(!_fgATIP) … else block)

52B (arrow pointing to RET( READY );)

Fig. 15

```
void ErrorHandler_0( )
{
  switch ( _bErrorCode[0])
  {
   case START_UP:
     switch ( _bErrorCode[1])
     {
      case READY:
        _bErrorCode[0] = EXIT_SRVFUNCTION;
        _bPlayerStatus = READY;
        return;

      case TRAY_EJECT:
        _bErrorCode[0] = EXIT_SRVFUNCTION;
        _bPlayerStatus = TRAY_EJECT;
        return;

      case bReadQPosition_Err:
        if( _fgDiskIsDVD)
        {
          _bMediaType=CDROM_DISC;
        }
        ServoOff_5( );
        _bPlayerStatus = _bErrorCode[2];
        _bErrCnt++;
        break;

      case bReadATIPPosition_Err:
        ServoOff_5( );
        _bPlayerStatus = _bErrorCode[2];
        _bErrCnt++;
        break;
```

Fig. 16

```
        case bReadLeadin_Err:
          switch( _bErrorCode[2])
          {
              case bSeekATIP_Err:
                 _bPlayerStatus = _bErrorCode[3];
                 switch( _bErrorCode[3])
                 {
                   case FOCUS_ERROR:
                      ...
                   case READATIP_ERROR:
                      ...
                 }
                 break;

              case ReadLeadinInfo_Err:
                 ...
          }
          break;

        default:
          break;
      }
    case CD_Q_SEEK
       ...
    default:
       _bErrorCode[0] = EXIT_SRVFUNCTION;
       _bPlayerStatus = ILLEGAL_COMMAND;
       break;
  }
  if( _bErrCnt >= MAX_ERR_CNT )
  {
   _bErrorCode[0] = EXIT_SRVFUNCTION;
  }
}
```

FIRMWARE STRUCTURING METHOD AND RELATED APPARATUS FOR UNIFYING HANDLING OF EXECUTION RESPONSES OF SUBROUTINES

BACKGROUND OF INVENTION

1. Field of the Invention

The invention relates to a firmware structuring method and related apparatus, and more particularly, to a method and apparatus which uses level management and unifies handling error recovery to eliminate the complexity of firmware.

2. Description of the Prior Art

In modern information society, information, images, and data are transferred, stored, and processed digitally and various electronic systems and devices, from mobile phones to computers used for accessing digital signals, have become essential appliances. In general, most electronic devices have a processor (or a microprocessor) for controlling operations. In the case of multi-functional or complex devices, the processor needs program code to specify related steps and control procedures due to the control procedures being more complex. The processor executes this program code to implement different functions of the electronic device. This program code is referred to as firmware code and is often stored in a non-volatile memory (flash memory for example) in order that the processor can read and execute it more efficiently. Additionally, in more complex electronic systems such as computers, peripheral devices have their own processor and corresponding firmware code. The host only needs to send higher-level control commands to the peripheral processor, which executes its own firmware code to control operations of the peripheral device. For instance, an optical disk drive of computer system has a processor and corresponding flash memory to store the firmware code. When the host wants to retrieve data stored on an optical disk, it just need to indicate the data address to optical disk drive and the processor of the optical disk drive executes its own firmware code to coordinate the operations of the spindle, pick-up head, and other components (such as requiring the spindle to reach a specific rotation speed and requiring the pick-up head to execute track seeking and track locking to a specific position to receive the reflection laser from the optical disk).

Please refer to FIG. 1. FIG. 1 is a function block diagram of a typical peripheral device 12 connected with a host 10. The peripheral device 12 is a typical electronic device having a processor 16 for controlling operations. Additionally, the peripheral device 12 further includes a volatile buffer memory 22 (like a random access memory), a non-volatile memory 24 (like a flash memory), and a hardware circuit 18 for implementing the functions of the peripheral device 12. The peripheral device 12 is usually connected to the host 10 and operates according to the control commands received from the host 10. The host 10 can be a computer having a CPU (central processing unit) 14A, a north bridge circuit 14B, a south bridge circuit 14C, a graphics card 14E, a monitor 14F, and a volatile memory 14D (like arandom access memory, RAM). The CPU 14A is used for controlling the operations of the host 10, the memory 14D is used for temporarily storing required data and programs of the CPU 14A, the graphics card 14E is used for processing image signals to transform the operational situation of the host 10 into an image on the monitor 14F. The north bridge circuit 14B is used for controlling the data transfer between the graphics card 14E, the memory 14D, and the CPU 14A; the south bridge circuit 14C is electrically connected to the CPU 14A via the north bridge circuit 14B, the peripheral device 12 exchanges instructions and data with the host 10 via the connection (such as via an IDE bus) with the south bridge circuit 14C.

In the peripheral device 12, in addition to the processor 16, a buffer memory 22 is used for temporarily storing required data during the peripheral device 12 operations, and a hardware circuit 18 having a codec 20A, a DSP (digital signal processor) 20B, and a servo module 20C is included. Since the instructions and data transfer between the host 10 and the peripheral device 12 must comply with a regular form or protocol, the codec 20A decodes the instructions and data transferred from the host 10 to the peripheral device 12. The processor 16 then controls the peripheral device 12 according to the decoded instructions and signals. In other words, the data transferred from the peripheral device 12 to the host 10 is also properly encoded by the codec 20A to comply with the data exchange format and protocol. The servo module 20C is controlled by the processor 16 to implement the main function of the peripheral device 12 and the DSP 20B processes the data and signals accessed by the servo module 20C. For example, if the peripheral device 12 were an optical disk drive used for accessing the data of an optical disk, servo module 20C would have a spindle 28A, a pick-up head 28B, and other required electrical components. The spindle 28A is used for rotating an optical disk 28C; the pick-up head 28B slides along a sliding track 28D to access data on different tracks of the optical disk. The data retrieved from the optical disk 28C by the servo module 20C is then processed by the DSP 20B and stored in the buffer memory 22 according to the arrangement of the processor 16, so that the host 10 can access data in the buffer memory 22 via the codec 20A. The host 10 retrieves data from the optical disk 28C via the peripheral device 12 of the optical disk drive. In other words, if the host 10 wants to write data to the optical disk 28C, it will transfer data to the buffer memory 22 via the codec 20A and under control of the processor 16, the host 10 then uses the servo module 20C to write the data temporarily stored in the buffer memory 22 to the optical disk 28C.

As mentioned above, the processor 16 of the peripheral device 12 controls the operations of the peripheral device 12 according to the control procedure recorded in the programs and the firmware code 26 stored in the non-volatile memory 24 used for recording these control procedures. The processor 16 executes the firmware code 26 to control the peripheral device 12 to execute various operations.

Please refer to FIG. 2, as well as to FIG. 1. FIG. 2 is a flowchart diagram of typical program structure of the firmware code 26 of the prior art. The firmware code 26 can be divided into two groups, one is an interface program IF0 and the other is a servo program SR0. The servo program SR0 includes a plurality of subroutines (such as subroutines R1, R2A-R2B, R3A-R3B, R4A-R4B, R5A-R5B, R6A-R6B, and R7A-R7B shown in FIG. 2 for example), wherein each subroutine is used for controlling the hardware circuit 18 to execute some specific operations. For example, a subroutine could control the pick-up head 28B of the servo module 20C to move from a position to another along the sliding track 28D, another subroutine could control the pick-up head 28B to adjust the power of a laser, and so on. The interface program IF0 also includes a plurality of subroutines, the main function of the interface program IF0 calls the corresponding subroutine of the servo program SR0 according to the instructions of the host 10 allowing the hardware circuit 18 to implement the function assigned by the host 10. An execution result of the servo program SR0 will return to the host 10 after executing the interface program IF0. For example, if the host 10 requests the peripheral device 12 to retrieve some data from an optical disk, the interface program IF0 calls the subroutine having the definition of data retrieving procedure of the servo program SR0. The processor 16 then executes this subroutine to control the hardware circuit 18 to implement this data retrieving procedure. If the subroutine completes successfully, it will send a procedure-finished message (such a message could be stored in a variable). The interface program IF0, according to this message, controls the peripheral device 12 to respond with the proper signals to the host 10 to indicate the result of procedure.

In general, owing to the rapid development of electronic devices, device controlling procedures and firmware code are becoming more and more complex. In order to shorten developing time, there are often many firmware engineers cooperating to each write a part of the subroutines and then integrate each part into the firmware code. As is well known in the art, a subroutine can modularize specific control procedures for convenient reuse. For example, in an optical disk drive, the pick-up head 28B is controlled to move from a position to another along the sliding track 28D when initialized after boot and when retrieving specific data from an optical disk or writing data to an optical disk. The program controlling the movement of the pick-up head 28B can be modularized into a subroutine and the programs used for controlling the optical disk drive to execute booting initialization, data retrieving or data writing, could call this subroutine to control the movement of the pick-up head to implement the action. Thereby, the engineers who are developing different subroutines do not unnecessary repeat coding the programs which are used for controlling the movement of the pickup head in the booting initializations, data retrieving and data writing programs.

Although sharing the same subroutines in different control procedures is convenient for developing firmware code, the prior art lacks the management for controlling the calls between subroutines. In particular, when each subroutine is developed by different firmware engineers, the engineer who developed a subroutine A may call a subroutine B, which engineer B developed, and the engineer who developed the subroutine A may not understand the detail of the subroutine B. Subroutine B may need to invoke a subroutine C, and the subroutine C need to further invoke a subroutine D, and so on. In this way, the operational flow of the invoked subroutines becomes too complex to control. Please refer to FIG. 2 illustrating a complex operational flow. The arrowheads shown in FIG. 2 represent the flow between subroutines. For instance, the processor 16 needs to execute a subroutine R1 of the servo program SR0 according to the call of the interface program IF0. The arrowhead A1 indicates that the subroutine R1 is executed. The subroutine R1 invokes the subroutines R2A and R2B in sequence and the arrowhead A2 indicates that the subroutine R2A is executed. After the subroutine R2A finishes, the arrowhead A3 indicates that subroutine R2B is executed. The subroutine R2B further invokes the subroutines R3A and R3B. The arrowhead A4 indicates the subroutine R3A is executed and the arrowhead A5 indicates that the subroutine R3B is next executed. The subroutine R3B further invokes the subroutines R4A and R4B in sequence, and the arrowhead A6 indicates that the subroutine R4A is executed. The arrowhead A7 indicates that subroutine R4B is executed. The subroutine R4B further invokes the subroutines R5A, R5B, and R5C in sequence, as indicated by the arrowheads A8, A9 and A10 respectively. When executing the subroutine R5C, the subroutines R6A and R6B are invoked. The arrowhead A11 indicates that subroutine R6A is executed and the subroutine R6A further invokes the subroutines R7A and R7B in sequence. The program next executes the subroutines R7A and R7B in sequence as shown by the arrowheads A12 and A13 respectively. The subroutine R6A is executed as indicated by the arrowhead A14. When the subroutine R6A is finished, the program continues and executes the subroutine R6B as the arrowhead A15 indicates. When the two subroutines R6A and R6B invoked by the subroutine R5C both finish, the program continues and executes the subroutine R5C as the arrowhead A16 indicates. The program proceeds with the subroutine R4B as indicated by the arrowhead A17. When the subroutine R5C finishes, the rest of the control procedure for the subroutines R5A to R5C is executed and then the subroutine R4B executes. When the subroutine R4B finishes, the program proceeds with the subroutine R3B as the arrowhead A18 indicates. When the subroutine R3B is finished, the subroutine R2B, which invoked subroutines R3A and R3B is executed as the arrowhead A19 indicates. When the subroutine R2B is finished, the execution flow will proceed to execute the subroutine R1 as the arrowhead A20 indicates. When the subroutine R1 is finished, the result of the execution of the subroutine R1 is returned to the interface program IF0 as the arrowhead A21 indicates.

As mentioned above, if subroutines are invoked without proper management, the execution flow may become too complex to trace. For example, while the firmware engineer develops the subroutine R1, the firmware engineer may invoke the subroutine R2B in the subroutine R1 due to the function of the subroutine R2B matching a required step of the controlling procedure. However, the firmware engineer may ignore that the subroutine R2B invokes subroutines R3A and R3B in sequence and the subroutine R3B will further invoke others. In this way, by executing the subroutine R1, the developing firmware engineer can not control the actual operational flow. If the developing firmware engineer needs to trace the execution flow of the subroutine R2A, it is no longer convenient to modularize the program code with subroutines.

Additionally, the complex and lengthy execution flow will consume considerable resources of the processor of the peripheral device 12. For instance, as is well known in the art, while the subroutine R1 is executed, if a program wants to execute the subroutine R2A invoked by the subroutine R1, as the arrowhead A2 indicates, each variable value of the subroutine R1 is temporarily stored in a stack arranged in the buffer memory 22 and can not be released. Further, while executing the subroutine R2B, subroutines R3A and R3B are invoked and each variable value of the subroutine R2B is temporarily stored in the stack and can not be released either. To continue executing the subroutines R3A and R3B, each variable value of the subroutine R3B is temporarily stored in the stack and can not be released before invoking subroutines R4A and R4B. In other words, in follow-up execution flow, each variable value of a subroutine A should be temporarily stored in the stack and can not be released before the subroutine B invoked by the subroutine A is finished. It is obvious that the more subroutines invoked during the execution flow (caused by some subroutines executing other subroutines once executed), the more variable values in the stack and the more memory space required of the buffer memory 22.

In addition, the complex and long series of different subroutine executions will make the program become more difficult to debug. Once a bug occurs, the firmware engineer must check each subroutine of the execution flow to find the crux of the problem. Additionally, when the need arises to debug a specific subroutine, difficulty is encountered since the firmware engineer can not be aware of the execution situation about the flow of subroutines. For example, when the firmware engineer checks the subroutine R4B, it is difficult to determine whether the operation of the subroutine R4B is correct since the execution situation of the other subroutines R3A, R3B and R5A to R5C in not known. If the subroutine R4B has a bug, it may cause an error of the subroutine R3A or the subroutines R5A to R5C.

Except the drawbacks mentioned above, nested execution of subroutines also causes difficult error recovery operations of the peripheral device 12. The firmware code 26 of the peripheral device 12 is used for integrating the operations of each electric component of the peripheral device 12. If there is a component malfunction (or a user suddenly changes the control of the peripheral device), it would interrupt normal execution flow of the firmware code 26 and cause an operation error of the peripheral device 12. At this time, the program runs an error recovery operation to recover the operation of the peripheral device 12 from abnormal malfunction. For example, if an optical disk drive is shocked suddenly during data retrieval and the position of the pick-up head 28B is changed, the optical disk drive probably needs to execute a track locking or a track seeking operation to recover to a normal data retrieving state. Of course the control procedure of the error recovery should be included in the firmware code 26 to control the peripheral device 12 for executing a recover operation when an error occurs. Please refer to FIG. 3. FIG. 3 is a schematic diagram of a typical program structure of the firmware code 26 of the prior art and is similar to FIG. 2. FIG. 3 further shows the practical method of error recovery of the prior art. As shown in FIG. 3, when the processor 16 executes the subroutine R3B to control the peripheral device 12 to operate, if an error occurs in the operations of the peripheral device 12, subroutines R8A and R8B are executed under the logic control of the step R3*s* for controlling the peripheral device 12 to execute the error recovery operations. When the subroutines R8A and R8B have finished correctly, the execution flow of the subroutine R1 proceeds to the subroutine R2B as the arrowhead A19 indicates.

However, in the prior art, incorrect error recovery commonly occurs in complex execution flows of series executions due to lack of management for error recovery. For example, as shown in FIG. 3, the subroutine R5A includes an error recovery mechanism. If an operational error of the peripheral device 12 occurs during execution of the subroutine R5A, the subroutine R9 is executed under the logic control of the step R5*s* to carry out error recovery. However, the firmware engineer who developed the subroutine R3B probably ignored the subroutine R5A, invoked by the subroutine R4B, and which already includes an error recovery mechanism, so that the controlling procedure related to the subroutine R5A error recovery is duplicated within subroutines R8A and R8B which account for the subroutine R3B recovery mechanism. The duplicated error recovery probably causes an execution flow delay, and could even cause an additional operational error of the peripheral device 12. Similarly, due to the firmware engineer who developed the subroutine R3B not being aware that the subroutine R4B will invoke the subroutine R6A, the recovery operations corresponding to the subroutine R6A error operation would not be included in the error recovery subroutines R8A and R8B. Once an operation error occurs in the peripheral device 12, while executing the subroutine R6A, the peripheral device 12 can not execute correct error recovery. In other words, in the prior art, due to the lack of management for error recovery in the execution flow of nested executions, an additional operational error is probably caused without properly error recovery, or too many redundant error recoveries are invoked without any error management.

In summary, because there is a lack of effective management for invoked subroutines and error recovery in the prior art, the firmware code structure is lower readability and too complex to trace and to debug, will consume considerable resources of the processor of the peripheral device, and will easily affect the normal operations of the peripheral device due to the lack of management for error recovery.

SUMMARY OF INVENTION

It is therefore a primary objective of the claimed invention to provide a new firmware structuring method and related apparatus, which can manage the order of execution effectively and unify the execution of error recovery according to various operational errors, in order to enhance the error recovery management and solve the above-mentioned problems.

There is no specific management norm for invoking subroutines in the prior art. The prior art firmware code structure forms a complex series of executions, not only lowering readability and increasing complexity to trace and to debug, but consumes considerable resources of the processor. Similarly, the prior art technique results in the peripheral device being unable to effectively execute error recovery or repeat the error recovery operations due to the lack of management for error recovery mechanism of subroutines.

The claimed invention provides two basic principles to manage the structure of executions and error recovery of firmware code in a peripheral device. The first involves classifying all subroutines into different levels according to the complexity of the corresponding operations. The lower-level or posterior subroutines are used for defining the simpler operations of the peripheral device. The higher-level or previous subroutines are used for invoking a plurality of lower-level subroutines to define more complex control procedures for the peripheral device. Since each higher-level subroutine invokes different lower-level subroutines to combine to form various control procedures, the invoke order can be effectively managed and it is easy to control the nested executions of firmware code execution flow.

The claimed invention further establishes an error-handling subroutine to unifying and handle the error recovery correspondingly. When the peripheral device executes various subroutines, each subroutine records results returning from the peripheral device executing corresponding operations in an error code. When higher-level subroutines are finished, the peripheral device executes the error-handling subroutine and execute the corresponding error recovery operations according to content of the error code. In other words, each subroutine does not execute error recovery operations itself, instead the errors are unified to define the corresponding recovery operations in an error-handling subroutine. In this way, incorrect error recovery between series executions is avoided.

These and other objectives of the claimed invention will no doubt become obvious to those of ordinary skill in the art after reading the following detailed description of the preferred embodiment that is illustrated in the various figures and drawings.

BRIEF DESCRIPTION OF DRAWINGS

FIG. 6 to FIG. 9 are code listings of the related subroutine code embodiment of FIG. 5.

FIG. 10 is a code listing of the error-handling subroutine code embodiment of FIG. 5.

FIG. 13 is a code listing of the main subroutine code embodiment of FIG. 12.

FIG. 15 is a code listing of a first level subroutine code embodiment of FIG. 12.

FIG. 16 and FIG. 17 are code listings of the error-handling subroutine code embodiment of FIG. 12.

DETAILED DESCRIPTION

Figure 1:
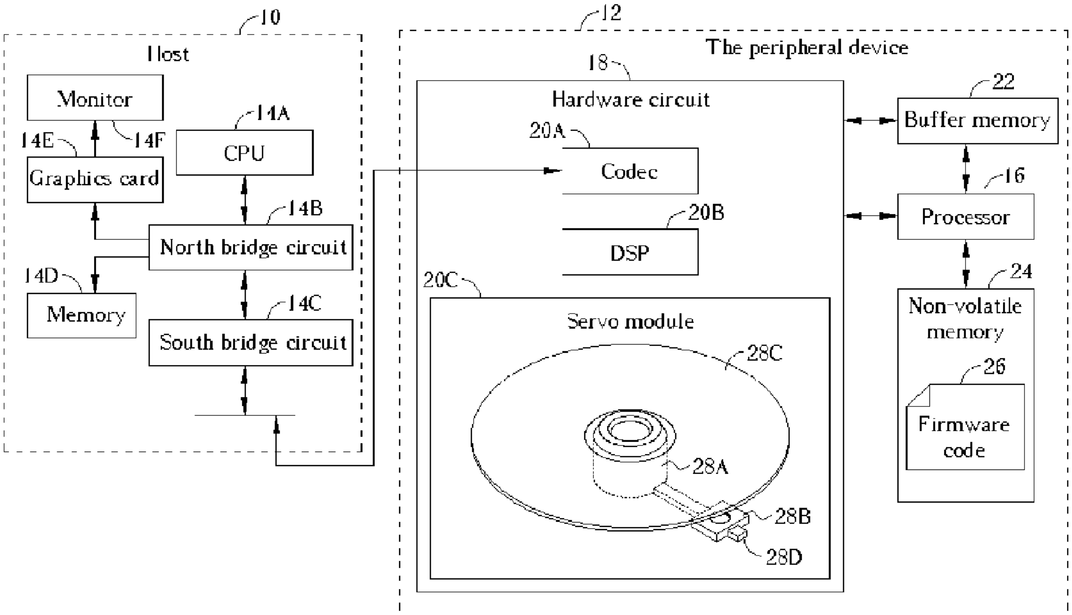
FIG. 1 is a function block diagram of a peripheral device and a host according to the prior art.
Figure 2:
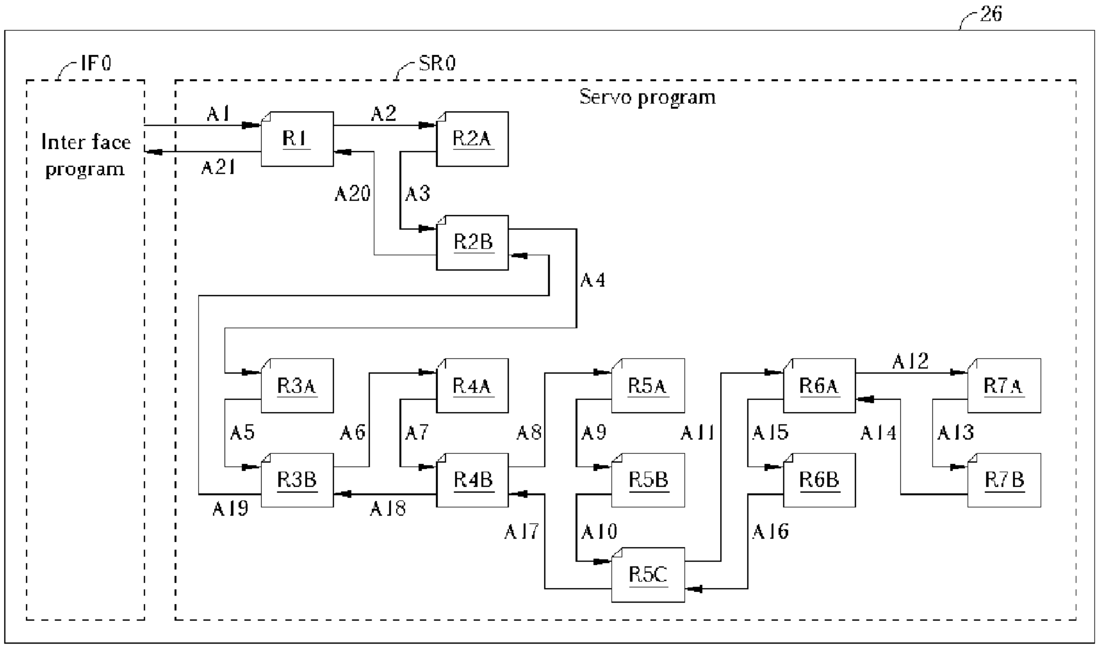
FIG. 2 and FIG. 3 are flowchart diagrams of firmware code structure according to the prior art.
Figure 3:
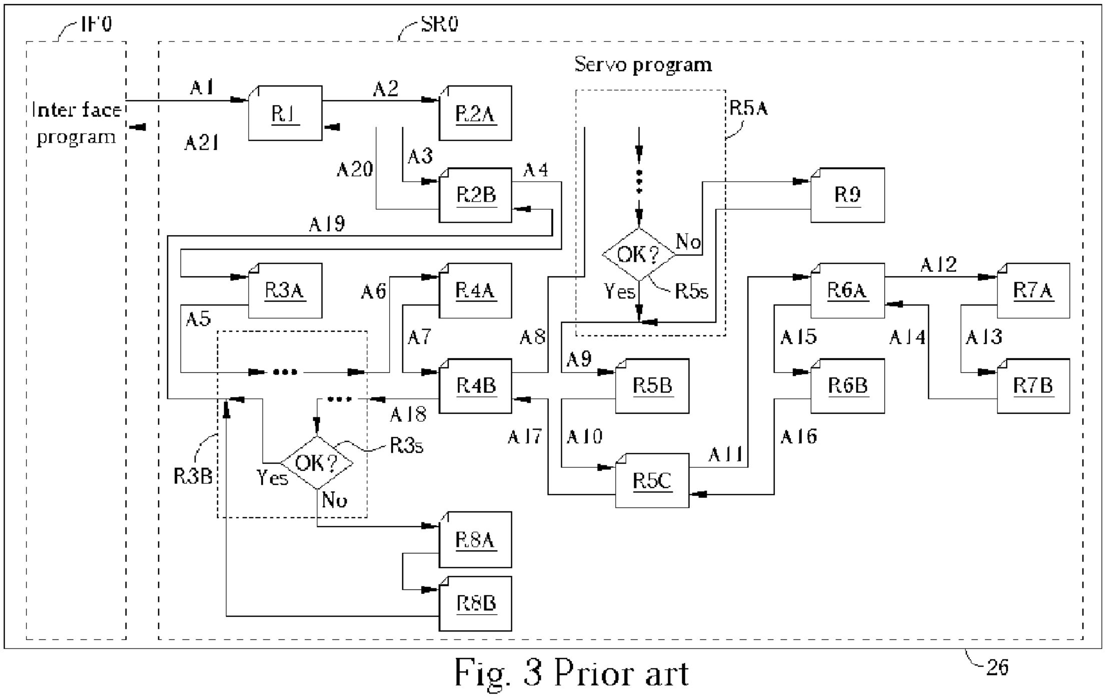
Figure 4:
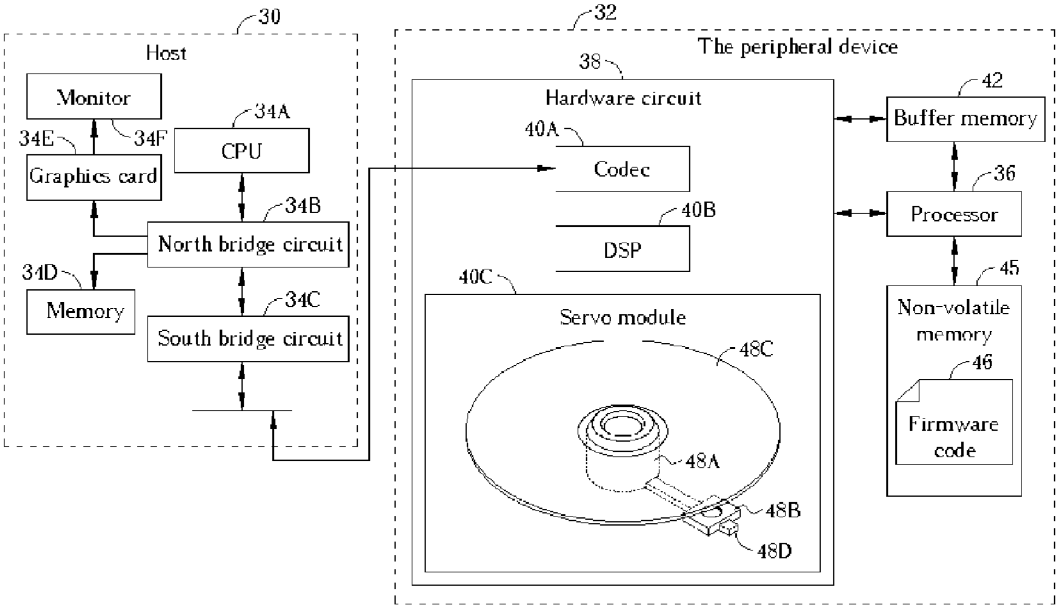
FIG. 4 is a function block diagram of a peripheral device and a host according to the present invention.

Please refer to FIG. 4. FIG. 4 is a function block diagram of a peripheral device 32 connected with a host 30 according to the present invention. The host 30 could be a main board of a computer system, comprising a CPU (central processing unit) 34A, a north bridge circuit 34B, a south bridge circuit 34C, a memory 34D, a graphics card 34E, and a monitor 34F. The peripheral device 32 could be a peripheral device used for expanding the function of the host, like an optical disk drive or a hard disk drive, etc. The peripheral device 32 having a processor 36 used for controlling the operations thereof, a volatile memory 42 (like arandom access memory, RAM) used for temporarily storing data during the peripheral device 32 operations, an non-volatile memory 45, and a hardware circuit 38 used for implementing the function of the peripheral device 32. In the host 30, the CPU 34A is used for controlling the operations thereof, the volatile memory 34D (such as arandom access memory, RAM) is used for temporarily storing required data during the host 30 operation; the graphics card 34E is used for processing image data to transform the operational situation of the host 30 into an image on the monitor 34F. The north bridge circuit 34B is used for controlling the data transfer between the graphics card 34E, the memory 34D, and the CPU 34A. The host 30 exchanges data and instructions with the peripheral device 32 via the south bridge circuit 34C that is electrically connected to the north bridge circuit 34B. In the peripheral device 32, the hardware circuit 40C includes a codec 40A, a DSP (digital signal processor) 40B, and a servo module 40C. The instructions and data transferred from the host 30 to the peripheral device 32 are decoded by the cedec 40A and are then received and processed by the processor 36. The DSP 40B processes the data and signals accessed by the servo module 40C. And the servo module 40C includes the electric components used for implementing the function of the peripheral device 32. For example, if the peripheral device 32 is an optical disk drive, the servo module 40C comprises a spindle 48A used for rotating an optical disk 48C, a pick-up head 48B for sliding along a sliding track 48D, and so on. The processor 36 executes a firmware code 46 stored in a memory 45 to control a hardware circuit 38 for implementing the default function of the peripheral device 32 after received the control commands from the host 30, wherein the memory 45 is a flash memory.

It is therefore a primary objective of the present invention to provide a new structuring model of firmware code. The present invention provides two principles for the structuring of firmware code. The first is different subroutine are classified into different levels. The lower-level or posterior subroutines are used for defining the more basic, simpler, or single-function operations of the peripheral device 32. The higher-level or previous subroutines are used for invoking a plurality of lower-level subroutines to combine to form more complex, whole-function control procedures, or more complex logic. Wherein the so-called more complex logic means that if the logic condition is true, a series of more complex control procedure should be executed; and if the logic condition is false, another more complex control procedure should be executed. The more complex logic could be integrated into a higher-level subroutine according to the present invention. Another principle is to establish an error-handling subroutine, to unify the management and to execute the error recovery correspondingly. In other words, when the peripheral device 32 executed a lower-level subroutine invoked by a higher-level subroutine, of an operational error occurs, no execution of the corresponding error recovery would take place but instead the situation of error is stored in an error code. When the higher-level subroutine finishes, the peripheral device 32 executes the error-handling subroutine for calling the recovery subroutines according to the error code and executes the recovery operations. The subroutine used for defining error recovery operations calls a recovery subroutine. The error-handling subroutine is used for unifying and managing all the corresponding error recovery operations so that the normal execution flow of the firmware code 46 is independent of the error recovery flow, both simplifying the normal execution flow and the error recovery mechanism. The firmware engineer is better able to control, trace, and debug the program; and the readability of program is also greatly improved.

Figure 5:
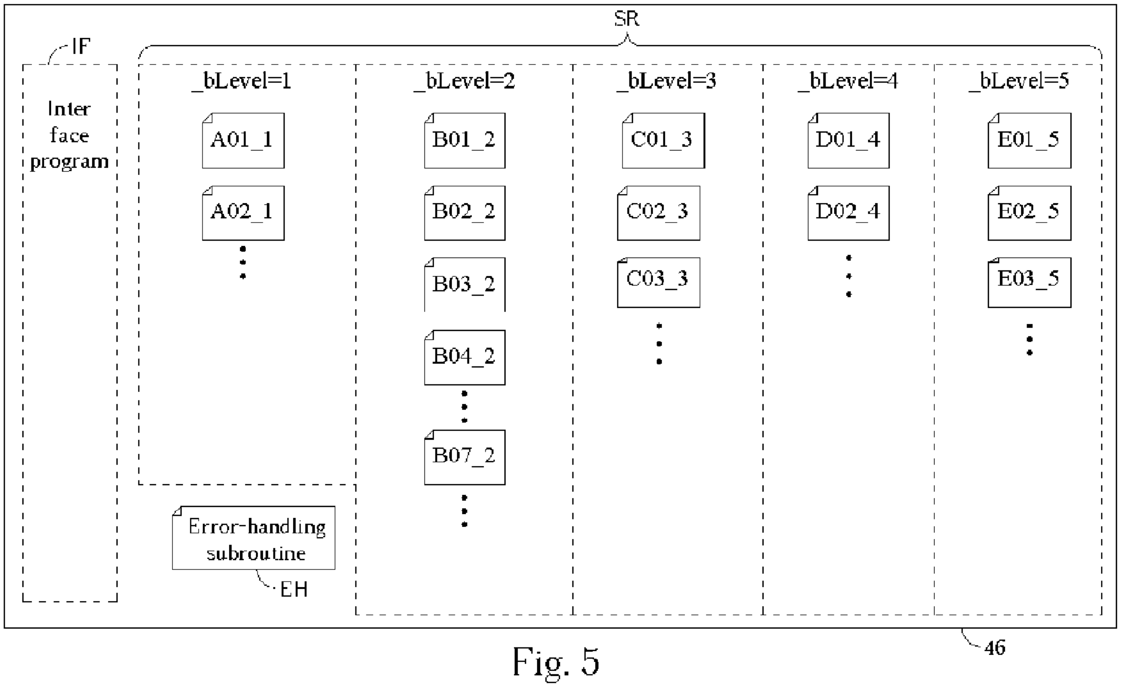
FIG. 5 is a flowchart diagram of the firmware code structure of FIG. 4.

The following further elaborates the embodiment of the present invention. Please refer to FIG. 5. FIG. 5 is a diagram of the structure of the firmware code 46 of present invention. As mentioned above, the subroutines of the firmware code 46 are divided into two groups, the first is an interface program IF and the second is a servo program SR. Each subroutine of the servo program SR is used for defining various control procedure of the peripheral device 32. The subroutine of the interface program IF invokes corresponding subroutines of the servo program for controlling the peripheral device 32 to execute required operations according to the control instructions of the host 30. The peripheral device 32 also executes the subroutines of the interface program IF for transforming the executed results of all the subroutines of the servo program SR into data with the proper format, and returns the data to the host 30. For convenience of elaboration, the following description assumes that the present invention is applied in the subroutines of the servo program SR.

As mentioned above, all subroutines of the present invention are classified into different levels. In the embodiment of FIG. 5, all subroutines of the servo program SR are classified into five different levels: the highest level comprising subroutines A01_1, A02_1 and so on (drawn in FIG. 5); the second level comprising subroutines B01_2, B02_2, B03_2, B04_2 to B07_2 and so on; the third level comprising subroutines C01_3, C02_3, C03_3 and so on; the fourth level comprising subroutines D01_4, D02_4 and so on; and the lowest level comprising subroutines E01_5 to E03_5 and so on. Additionally, a subroutine EH is the error-handling subroutine. The lowest level subroutines such as the subroutines E01_5 and E02_5 are used for defining the more basic, simpler (without complex logic) operations, and are also used for setting the required parameters of the peripheral device 32 operations. The higher-level subroutines are used for calling different lower-level subroutines to combine to form more complex control procedure and more complex logic. The fourth level subroutines D01_4 and D02_4 are used for calling different subroutines of the fifth level to combine to form different control procedure. For the same reason, the third level subroutines C01_3, C02_3 and C03_3 invoke the fourth and the fifth level subroutines to combine to form control procedure which are more complex than the subroutines of the fourth level. The second level subroutines, such as the subroutine B01_2, further invoke all subroutines of the third, the fourth and the fifth levels to combine to form control procedures with more complex and more complete functions. Finally, the highest level, the first level subroutines, invoke all the subroutines between the second level to the fifth level to combine to form the most complete and most complex control procedures (or most complex logic).

In the preferred embodiment, only the lowest level subroutines are allowed to invoke each other, the other level subroutines are not allowed to invoke the subroutines of the same level. For example, the lowest level subroutine E01_5 of FIG. 5 could invoke the subroutines E02_5 and E03_5; in other words, While executing the subroutine E01_5, the program could first execute the subroutines E02_5 and E03_5. When the subroutine E03_5 is finished, the rest of the control procedure of the subroutine E01_5 is processed. However, the subroutines of the higher-levels can not invoke other subroutines within the same level. For example, the third level subroutines C01_3, C02_3 and C03_3 can not invoke each other, meaning the execution flow does not allow execution of other third level subroutines until the subroutine C02_3 finished. Additionally, the lower-level subroutines are not allowed to invoke the higher-level subroutines according to the present invention. For instance, if there is a control procedure of the peripheral device 32 needing to execute the subroutines E01_5, E02_5 and D01_4, it should define a third level subroutine to invoke these three lower-level subroutines rather than define a fourth level or a fifth level subroutine to invoke these three subroutines which belong to the fourth or the fifth level respectively.

The complex series of executions between subroutines is avoided in the firmware code 46 by arranging the invoke order according to the present invention. The lowest level subroutines (such as the fifth level subroutines of FIG. 5) are used for defining the most basic, simplest, and single-function operations of the peripheral device 32 so that invoking between them does not form complex and hard to trace series of code and does not consume considerable resources of the processor 36 either. The higher-level subroutines have more complex function and logic so the present invention uses them to invoke lower-level subroutines and restricts the same level subroutines from invoking each other effectively avoids the complex and chaotic series of executions. In other words, by managing the invoking between subroutines according to the principle of the present invention, the execution flow of the series invokes is effectively controlled. For example, in the five levels embodiment of FIG. 5, the first level subroutines can invoke the second level subroutines, the second level subroutines can invoke the third level subroutines, the third level subroutines can invoke the fourth level subroutines, and the fourth level subroutines can invoke the fifth level subroutines. This limits the number of times of series executions to approximately four times and no longer allows an increase in the complexity of series invoking between subroutines (as mentioned above, same level invoking between the fifth level subroutines does not increase the complexity of series execution). This is a practice of the principle in which the higher-level-to-lower-level invoke order does not allow invoking within the same level according to the present invention. Looking at a non-compliant counterexample, if a first level subroutine invokes a second level subroutine B01_2, and the subroutine B01_2 also invokes a subroutine B02_2 of the same level, then the number series executions would increase by at least one. If a subroutine E02_5 also invokes a higher-level subroutine, such as the subroutine B02_2, then the number of series executions and the complexity is greatly increased. This is because after the subroutine E02_5 is invoked, the subroutine B02_2 further invokes the third level to the fifth level subroutines. Invoking between subroutines without limit and without order is the reason why the complexity of the series executions could not be controlled in the prior art. In contrast, the present invention disclose a principle to manage the invoking, effectively control the number of series executions, and to decrease the redundancy program code and the complexity without affecting the purpose of using subroutines to integrate various control procedure.

Besides systemizing the invoking order, the present invention using the error-handling subroutine EH (as shown in FIG. 5) to integrate the error recovery corresponding to different operations error control procedures. To cooperate with the error-handling subroutine EH, all subroutines record the situation of an operation error in a global error code variable, which can be accessed by each subroutine. For further details, please refer to FIG. 6 to FIG. 9 as well as to FIG. 5. FIG. 6 to FIG. 9 are code listings of program code of the subroutines A01_1, B01_2, C01_3, and D01_4. In FIG. 6, there are also some macros defined, such as a macro ChkStatus and so on, which the following illustration requires. The content of the program code shown here and in the following figures are in the C language format, but of course other program languages could be used in practice. For brevity, further details of the program code syntax (such as constant, variable, claim of function, and definition) are omitted here. As shown in FIG. 6, while the servo program SR is executed, there is a global variable _bLevel used for showing the level of the current subroutine. As shown in FIG. 5, the value of the variable _bLevel should be "1" when the first level subroutine is executed; similarly, while the second level to the fifth level subroutines executed, the value of variable _bLevel should correspondingly be "2" to "5". Before the subroutine A01_1 is executed, the value of the variable _bLevel should be set to "0." Additionally, a global array variable _bErrorCode is the error code.

As shown in FIG. 5, when the first level subroutine A01_1 is executed, the variable _bLevel is incremented by "1", to represent that the execution flow is executing a first level subroutine. Then the subroutine A01_1 executes the program section 50A in FIG. 6 according to the value of a status variable _fgSelectB01_2 to do a logic determination. If the variable _fgSelectB01_2 is true then invoke a second level subroutine B01_2, otherwise invoke the subroutine B02_2. The subroutines B01_2 and B02_2 return a byte value representing the corresponding operation result after the peripheral device 32 executed the subroutines B01_2 and B02_2. If the subroutines B01_2 and B02_2 return a value of a constant READY, this means the peripheral device 32 executed the subroutines B01_2 and B02_2 successfully without any operational error. On the other hand, if the peripheral device 32 executes the subroutine B01_2 with an operation error, the subroutine B01_2 does not return a value of the constant READY. As shown in FIG. 6, if the return value of the subroutine B01_2 is not the constant READY, the subroutine A01_1 records a code (meaning the value of a constant B01_Err) which represents the operational error of the subroutine B01_2 in an element (namely _bErrorCode[1]) of an error code _bErrorCode then resets the value of variable _bLevel to "0" and interrupts the execution of the subroutine A01_1. The value of a constant (!READY) is returned to represent that an operational error occurred while the subroutine A01_1 was executed. At this time, the error code _bErrorCode[1] uses the constant B01_Err to record that this operational error occurred while the subroutine B01_2 was executed. Similarly, if the peripheral device 32 has an operational error while executing the subroutine B02_2, the subroutine A01_1 is interrupted, and returns the value of the constant (!READY) to represent that an operational error occurred and record the value of the constant B02_Err in the error code _bErrorCode[1] to represent that operation error occurred while the subroutine B02_2 was executed.

Similarly, the subroutine A01_1 proceeds to execute to the program sections 50B and 50C in sequence. Using the program section 50B as an example, the subroutine A01_1 invokes the subroutine B03_2 within this section to control the peripheral device 32 to execute corresponding operations. If an operational error occurs while the peripheral device 32 operates according to the subroutine B03_2, the subroutine B03_2 will not return the value of the constant READY. At this time, the subroutine A01_1 determines that an operational error has occurred in the peripheral device 32 according to the return value of the subroutine B03_2 and records the value of a constant B03_Err, which represents an operational error occurred while the subroutine B03_2 was executed in the error code _bErrorCode[1]. And then the subroutine A01_1 is interrupted and returns the value of the constant (!READY), to represent that the subroutine A01_1 was interrupted due to the operational error that occurred while the peripheral device 32 was accessed. In other words, the subroutine A01_1 determines whether an operational error occurred in the peripheral device32 according the return value of the lower-level (meaning lower than the first level, of which the subroutine A01_1 belongs to) subroutines that were invoked by the subroutine A01_1. The lower level subroutines record the error situation (such as which lower-level subroutine the operation error occurred at) in the error code _bErrorCode, as well as that in the program sections 50A, 50B and 50C. On the other hand, if there is no operational error while the peripheral device 32 executes the lower-level subroutines invoked by the subroutine A01_1, the subroutine A01_1 executes the program section 50D successfully and records the value of the constant READY in the error code _bErrorCode[1] to represent all lower-level subroutines invoked by the subroutine A01_1 have been successfully finished. The subroutine A01_1 returns the value of the constant READY to represent that it was also finished successfully and to terminate the execution of the subroutine A01_1. Please notice that in the subroutine A01_1, a program instruction "_bErrorCode[_bLevel−−]= . . . " is used for recording the error code _bErrorCode and not only record the corresponding value of constants in the error code _bErrorCode[1], but also to subtract "1" from the value of a variable _bLevel, so that the value of the variable _bLevel is restored to that before the subroutine A01_1 be executed. As shown in FIG. 6, after using the program instruction "_bErrorCode[_bLevel−−]= . . . " to set the value of the error code, the execution of the subroutine A01_1 is terminated and an instruction "Return( . . . )" is used to return the corresponding value. The value "1" is subtracted from the value of the variable _bLevel to restore the value to that before the subroutine A01_1 was invoked. This operation corresponds with the first instruction "++_bLevel" of the subroutine A01_1.

As shown in FIG. 7, the subroutine B01_2 belongs to the second level and also invokes other lower-level (the third level to the fifth level) subroutines, such as the subroutine C01_3. However, at the beginning of the subroutine B01_2, an increment by "1" instruction to the global variable _bLevel is used so that it becomes "2" (because the subroutine B01_2 was invoked by the subroutine A01_1, and the variable _bLevel had been set to "1" when the subroutine A01_1 was executed). This represents that the firmware code 46 is executing a second level subroutine. As a program section 50E shown in FIG. 7, if there is an operational error while the peripheral device 32 executes the subroutine C01_3 invoked by the subroutine B01_2, the subroutine C01_3 does not return the value of the constant READY. The subroutine B01_2 then records the value of the constant C01_Err in an error code _bErrorCode[2]. The error code represents an operational error occurred while the peripheral device 32 executed the operations corresponding to the subroutine C01_3. And then the subroutine B01_2 is terminated and returns the value of the constant (!READY) to represent an operational error occurred while the subroutine B01_2 was executed. On the other hand, if the subroutine B01_2 successfully went through to a program section 50F, the value of the constant READY is recorded in the error code _bErrorCode [2], and the subroutine B01_2 is terminated after restoring the value of the variable _bLevel. Please notice that because the subroutine C01_3 is a lower-level subroutine, its operational result will be recorded in a sub-element (as well as _bErrorCode[2]) of the error code _bErrorCode as an array variable. In other words, the present invention uses different elements (these elements can be regarded as different fields of a tabular form) of the error code _bErrorCode to record that the operational error occurred while different level subroutines were executed. As shown in FIG. 6 and FIG. 7, while the peripheral device 32 executes the subroutine B01_2 invoked by the subroutine A01_1, if an operational error occurs when executing the subroutine C01_3 invoked by the subroutine B01_2, not only the subroutine B01_2 will set the error code _bErrorCode[2] to the constant C01_Err, but also the subroutine A01_1 will set the error code _bErrorCode[1] to the constant B01_Err. Thus, the error code uses the different elements in the array variable to record the operational error of subroutines of all levels.

As shown in FIG. 8, the subroutine C01_3 invokes the lower-level subroutine D01_4. The subroutine D01_4 shown in FIG. 9 invokes the lowest level subroutines E01_5 and E02_5. Of course, there could be corresponding program sections within these subroutines to set the value of variable _bLevel and to record the operational error of all subroutines in the error code _bErrorCode. The related implementation details are found in FIG. 5.A and FIG. 7 and are thus omitted here. As shown in FIG. 6 to FIG. 9, not only the elements of the error codes _bErrorCode[1] and _bErrorCode [2] are used for recording the corresponding operational error of different level subroutines, but the error code _bErrorCode [0] is used for recording the operational error of the first level subroutines according to the present invention. As shown in FIG. 6, after the subroutine A01_1 finishes, a code that represents it could be recorded in the error code _bErrorCode[0]. For example, while the peripheral device 32 is executing the subroutine A01_1, if an operational error occurs when the subroutine C01_3 is invoked by the subroutine B01_2, the subroutines B01_2 and A01_1 terminate in sequence and the value of constants A01, B01_Err, and C01_Err is recorded in the error code _bErrorCode[0], _bErrorCode[1], and _bErrorCode[2] respectively. The value of the constant A01 means the error occurred while the subroutine A01_1 was executed. Of course, it may not be necessary for some simple or low-level subroutines to return the operation result, or to record the error in the error code.

As mentioned above, a feature of the present invention is using an error-handling subroutine EH to unify the handling of the operational error that occurs while the peripheral device 32 is executing a subroutine to execute corresponding error recovery. Please refer to FIG. 10. FIG. 10 is a code listing of the error-handling subroutine code embodiment of FIG. 5, wherein the subroutine is named ErrorHandler. After a highest level subroutine (a first level subroutine A01_1 for example) finishes, the error-handling subroutine EH continues to execute error recovery corresponding to the operational error which occurred while the subroutine A01_1 was executing according to the present invention. As shown in FIG. 6, the value of the variable _bLevel should restore to "0" after the subroutine A01_1 finishes. And as shown in FIG. 10, after the subroutine A01_1 finishes and the error-handling subroutine EH began to execute, the error-handling subroutine EH first checks the value of the error code _bErrorCode[0], to determine whether it needs to do error recovery. If there is an operational error, program section 50G is used to determine what error recovery needs to do according to the first level subroutine executed before. Wherein the variable _bFunctionCode is used for representing the first level subroutine executed previously and for recording the value of the variable in the error code _bErrorCode[0]. For example, if the value of variable _bFunctionCode is the constant A01, it means the subroutine executed previously was the subroutine A01_1 and a program section 50H is be used to do error recovery corresponding to the subroutine A01_1. If the value were another constant A02, it means the subroutine previously executed was the subroutine A02_1 and a program section 501 is used to do error recovery corresponding to the subroutine A02_1 and so on. As the embodiment shown in FIG. 10, after the previous subroutine A01_1 is determined, further checks are done to the value of the error code _bErrorCode[1] within the program section 50H. For instance, if the value recorded in the error code _bErrorCode[1] were the constant B01_Err, it would further check the error situation recorded in the error code _bErrorCode[2] within the program section 50J. As the definition of the program section 50J shows in FIG. 10, if the value recorded in the error code _bErrorCode[2] is constant C01_Err, the error-handling subroutine EH invokes another subroutine B07_2 for controlling the peripheral device 32 to execute the corresponding error recovery. In other words, while the peripheral device 32 executes the subroutine B01_2 invoked by the subroutine A01_1 and after an operational error occurred while the subroutine C01_3 was executing, a subroutine B07_2 is executed to recovery the corresponding error. The subroutine B07_2 is also an error recovery subroutine. After the subroutine A01_1 is terminated, the error-handling subroutine EH will invoke the subroutine B07_2 according to the error situation recorded in the error code _bErrorCode to execute the necessary error recovery.

Figure 11:
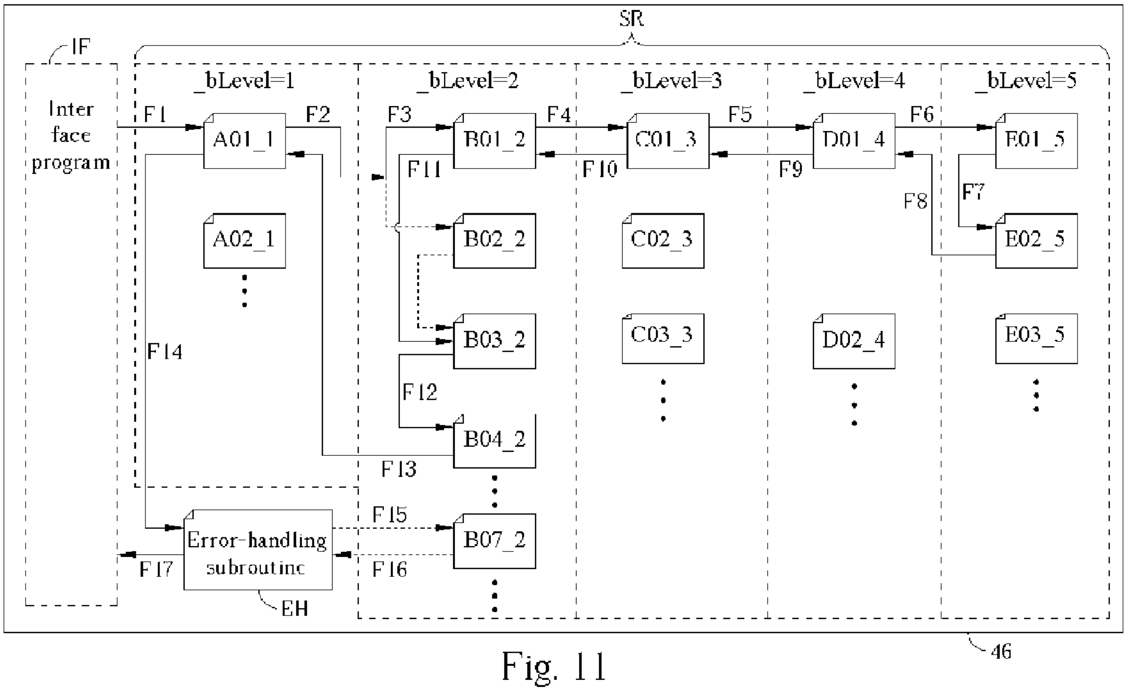
FIG. 11 is a flowchart diagram of the execution flow of the firmware code of FIG. 5.

In summary, the present invention uses an error-handling subroutine EH to unify the managing of various corresponding error recovery events. The error-handling subroutine EH will invoke corresponding recovery subroutines to do error recovery according to the error situation (such as the operational error occurring at a particular level and a particular subroutine) recorded in the error code _bErrorCode. In other words, all the operational error and corresponding error recovery is systematically classified according to the error situation and recorded in the error-handling subroutine for unify managing the error recovery. Thus, the complexity and redundancy of executing the error recovery is prevented. Additionally the error recovery is effectively completed due to subroutines handling error recovery respectively in contrast to the prior art. Please refer to FIG. 11. FIG. 11 is a flowchart diagram of execution flow of the firmware code of FIG. 5. FIG. 11 is a summarization of the execution flow of the subroutines shown in FIG. 6 to FIG. 10. First of all, the interface program IF executes the subroutine A01_1 of the servo program SR according to the instructions of the host 30 (see at FIG. 4) for controlling the peripheral device 32 to execute operations correspondingly. As the arrowhead F1 indicates, the subroutine A01_1 begins to be executed and then follows up with an arrowhead F2 to execute to the subroutine B01_2 or B02_2 (as shown in FIG. 6). The following description assumes that the subroutine B01_2 is executed. The subroutine B01_2 invokes the lower level subroutine C01_3, the subroutine C01_3 invokes the lower level subroutine D01_4, and the subroutine D01_4 further invokes the lowest level subroutines E01_5 and E02_5, as arrowheads F3 to F11 indicated. After the subroutine B01_2 is finished, it continues to execute the subroutines B03_2 and B04_2, invoked by the subroutine A01_1, as arrowheads F12 to F13 indicate. After the subroutine A01_1 is finished, the execution flow goes through to the error-handling subroutine EH as arrowhead F14 indicates, and the error-handling subroutine EH executes corresponding error recovery according to the operational error that occurred while the subroutine A01_1 was executing. After the error-handling subroutine EH is finished, the execution flow returns to the interface program IF as indicated by the arrowhead F17. When the error-handling subroutine EH is executed, it also resets the error code _bErrorCode according to the recovery operation. For example, if the error recovery was successfully finished, the error-handling subroutine EH changes the error code _bErrorCode from the recorded error to an error value. Perhaps the subroutines of the servo program SR are unable to finish error recovery corresponding to a particular error (for example, a user suddenly interrupts the normal operation of the peripheral device 32 while it operates and the peripheral device 32 can not continue to operate until receiving the next control command form the user), at this time, the interface program IF returns the error situation of the error code _bErrorCode to the host 30.

Figure 12:
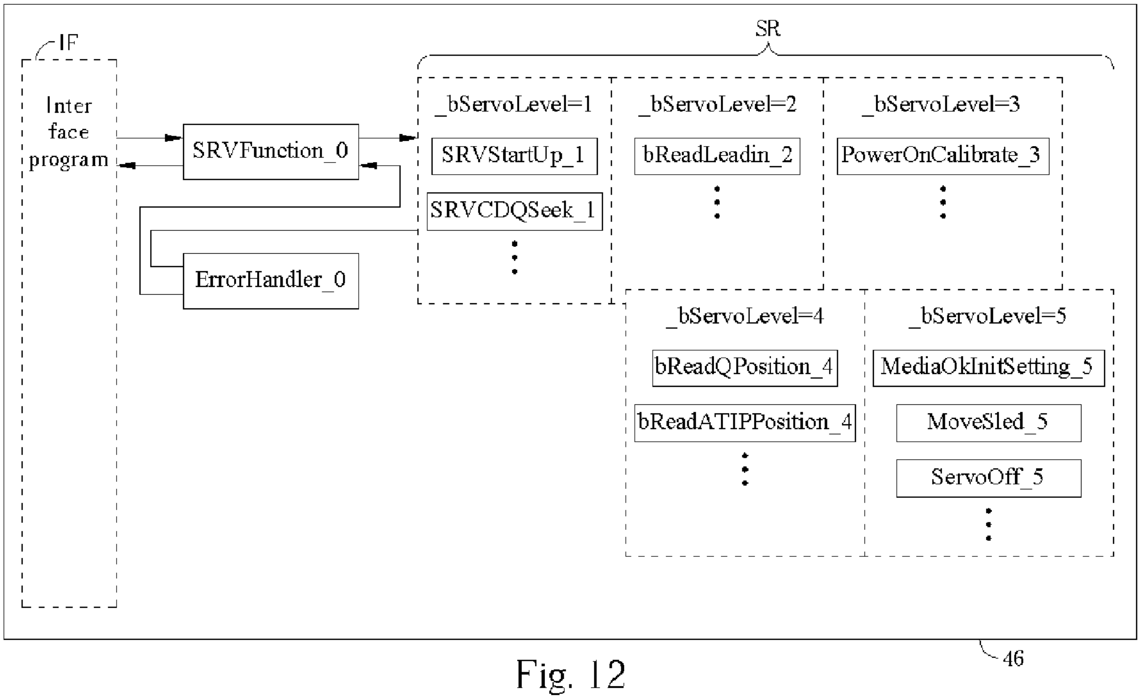
FIG. 12 is a flowchart diagram of another embodiment of firmware code structure according to the present invention.

To further elaborate the practical implementation of the present invention, the following describes the present invention applied in a recordable optical disk drive (CD burner). In other words, the peripheral device 32 in FIG. 4 of the present invention is an optical disk drive, the processor 36 of the optical disk drive used for executing the firmware code 46 to control operations of the optical disk drive. Please refer to FIG. 12. FIG. 12 is a flowchart diagram of a subroutine structure of the firmware code 46. The firmware code 46 also comprises the interface program IF and the servo program SR; the following using the servo program SR with the present invention as an embodiment. In this embodiment as shown in FIG. 12, the various subroutines of the servo program SR are classified into five levels, the highest level (the first level) comprising subroutines SRVStartUp_1, SRVCDQSeek_1 and so on; the second level comprising subroutines bReadLeadin_2 and so on; the third level comprising subroutines PowerOnCalibrate_3 and so on, the fourth level comprising subroutines bReadQPosition_4, bReadATIPPosition_4 and so on; the lowest level (the fifth level) comprising subroutines MediaOKlnitSetting_5, MoveSled_5, ServoOff_5 and so on. Please notice the last number of the subroutine name is used to representing the level at which the subroutines is positioned. For instance, the last number "5" of the name of the subroutine ServoOff_5 means it is a subroutine of the fifth level. In practical implementations, adding a number of the level to which a subroutine belongs, would help the firmware engineers identify which level the subroutine is positioned and they can easier follow the principle and order of invoking subroutines according to the present invention. Additionally tracing the execution flow of firmware code and debug becomes much easier.

Figure 14:
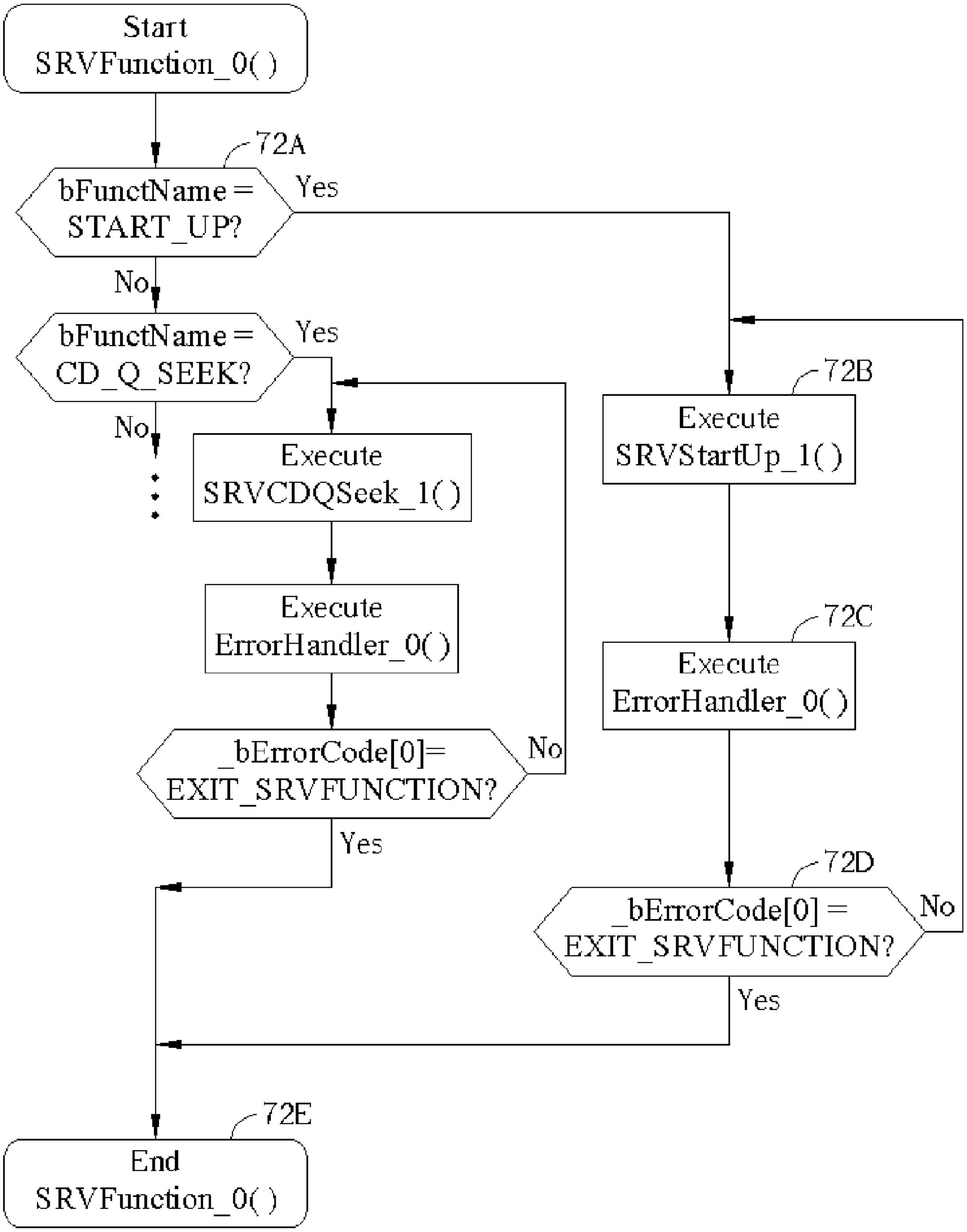
FIG. 14 is a flowchart of the execution flow of the subroutine of FIG. 13.

Except when subroutines belong to different levels, the interface program IF can further be used as a subroutine SRVFunction_0 to unifying invoking the first level subroutines and a subroutine ErrorHandler_0 is the error-handling subroutine of the present invention. Please refer to FIG. 13 and FIG. 14 as well as to FIG. 12. FIG. 13 is a code listing of the program code embodiment of the subroutine SRVFunction_0. FIG. 14 is a flowchart of execution for the subroutine SRVFunction_0. There are also some constants defined (such as the value of ENTRY_LEVEL is "0") and macros (such as a macro RET). A global array variable _bErrorCode is used for recording an error that occurs while subroutines of the servo program SR are executed. Additionally, a global variable _bPlayerStatus could also be regarded as another error code, used for unifying recording the error situation of all subroutines. A global variable _bServoLevel used for recording what level the subroutine the firmware code 46 is executing is. A global variable _bServoLevel is used for controlling the repeated times of error recovery (this will be further elaborated later).

When the firmware code 46 begins to execute, the interface program IF sets the value of the variable bFuncName according to the control instruction of the host 30, and invokes the subroutine SRVFunction_0 according to the value of the variable. The subroutine SRVFunction_0 invokes the first level subroutines corresponding to the value of the variable bFuncName. As shown in FIG. 13 and FIG. 14, if the variable bFuncName is a value of a constant START_UP, it represents that the peripheral device 32 was beginning to be initialized and the subroutine SRVFunction_0 would invoke a corresponding subroutine SRVStartUP_1 for controlling the peripheral device 32 to execute initialization and to record the value of the constant START_UP in the error code _bErrorCode[0]. Similarly, if the variable bFuncName is a value of a constant CD_Q_SEEK, this represents the peripheral device 32, which means the optical disk drive was executing a quick track seek. The subroutine SRVFunction_0 invokes a corresponding subroutine SRVCDQSeek_1 for controlling the peripheral device 32 to execute a quick track seeking and to record the value of the constant CD_Q_SEEK in the error code _bErrorCode[0], and so on. After the first level subroutines were finished, the subroutine SRVFunction would invoke the error-handling subroutine ErrorHandler_0 to execute the error recovery corresponding to the operational error that occurred while the first level subroutines were executing. More distinctly, the subroutine SRVFunction_0 includes a program instruction "do . . . while" used for controlling the execution flow according to the executed situation of the error recovery of the subroutine ErrorHandler_0 to control retry operations of the first level subroutines. When the subroutine ErrorHandler_0 is executed after the first level subroutines finished, the subroutine ErrorHandler_0 resets the value of the error code _bErrorCode according to the situation of recovery to reflect the executed situation of error recovery. After the subroutine ErrorHandler_0 is finished, the subroutine SRVFunction_0 uses a program instruction "while" to determine whether to use the program instruction "do . . . while" to retry the first level subroutines according to the value of the error code.

The control flow of retry operations mentioned above is also shown in the flowchart of FIG. 14. As shown in FIG. 14, the interface program invokes the subroutine SRVFunction_0 according to when the variable bFuncName is the value of the constant START_UP. The subroutine SRVFunction_0 then goes from step 72A of FIG. 7 to step 72B and step 72C. When the subroutine ErrorHandler_0 is executed in step 72C, the error code _bErrorCode changes (the operational situation of the subroutine ErrorHandler_0 will be further elaborated later). After step 72C is finished, the subroutine SRVFunction_0 uses a program instruction "while" to determine the following flow according to the value of the error code _bErrorCode[0]. If the error code _bErrorCode[0] is equal to the value of a constant EXIT_SRVFUNCTION, it could go to step 72E and finish the subroutine SRVFunction_0. On the other hand, if the error code _bErrorCode[0] is not equal to the value of the constant EXIT_SRVFUNCTION, the subroutine SRVFunction_0 retries step 72B and step 72C. While executing step 72C, the subroutine ErrorHandler_0 also resets the value of the error code _bErrorCode according to the error occurred after the retry. It then goes through to step 72D again to determine whether it needs to again retry, and so on.

Please refer to FIG. 15. FIG. 15 is a code listing of a firmware code embodiment of a first level subroutine SRVSTartUp_1. When the subroutine SRVFunction_0 invokes the subroutine SRVSTartUp_1, the subroutine SRVSTartUp__1 begins to execute and increments by "1" the variable _bServoLevel to represent the execution flow already went through to a first level subroutine. And then the subroutine SRVStartUp_1 checks the status of a variable _fgKEjtPressed, wherein the variable used for representing whether the user pressed the "eject" button of the peripheral device 32 using the definition of a macro ChkStatus shown in FIG. 13. If the user pressed the "eject" button, the subroutine SRVStartUp_1 executes a macro RET to set the value of the error code _bErrorCode[1] to the value of a constant TRAY_EJECT, resets the value of variable _bServo Level to "0", and then finishes. Since the user pressed the "eject" button, the subroutine SRVStartUp_1 could also be terminated. On the other hand, if the user did not press the "eject" button, the subroutine SRVStartUp_1, according to the value of a variable _fgPowerOnlnit, determines whether the peripheral device 32 had initialized after boot. If not, it further invokes a third level subroutine PowerOnCalibrate_3 for controlling the peripheral device 32 to execute the related calibration and booting initialization, and invoke a subroutine MoveSled_5 of the fifth level for moving the pick-up head 48B (see at FIG. 4) to an initial position. The subroutine SRVStartUp_1 further invokes a subroutine CheckMotorStop_5 of the fifth level to check whether the spindle 48A started rotating, and so on.

As in the program section 52A shown in FIG. 15, the subroutine SRVStartUp_1 also determines which type of optical disk 48C is being used according to the value of a variable _fgATIP (the subroutine SRVStartUp_1 could able to invoke another lower-level subroutine to set the value of this variable). If the peripheral device 32 could not retrieve the pre-groove signal (it also requires an Absolute Time In Pre-Groove, ATIP), which only exists on recordable optical disks, from the optical disk 48C, that means the optical disk is a read-only optical disk (such as a general Compact Disk, CD). At this time, the subroutine SRVStartUp_1 invokes a fourth level subroutine bReadQPosition_4 for retrieving a signal Q from the read-only optical disk. Generally, the tracks used for recording data of an optical disk are divided into different data frames used for recording data of a certain capacity. Each data frame has an address thereof. The optical disk drive uses the signal Q, retrieved from the read-only optical disk, for getting the address of any data frames and to find a specific data frame according to the address. If any operational error occurs when the peripheral device 32 executes the operation corresponding to the subroutine bReadQPosition_4 (such as the optical disk has a scratch so that the addressing information of data frame can not be retrieved from the signal Q), it is reflected by the return value of the subroutine bReadQPosition_4 and the subroutine SRVStartUp_1 executes the macro RET to record the value of the constant bReadQPosition_Err in the error code _bErrorCode[1] to reflect the operational error of the subroutine bReadQPosition, and to terminate the subroutine SRVStartUp_1. On the other hand, if the optical disk 48C is a recordable optical disk (such as a CD-R or a CD-RW) according to the variable _fgATIP, the subroutine SRVStartUP_1 would invoke the fourth level subroutine bReadATIPPosition_4 for controlling the peripheral device 32 to retrieve the signal ATIP. Compared with the signal Q of a read-only optical disk, an optical disk drive uses the signal ATIP retrieved from a recordable optical disk for addressing the data frame of the recordable optical disk. If the return value of the subroutine bReadATIPPosition_4 reflects an operational error occurred in the peripheral device 32 (such as the addressing information of data frame can not be retrieved from the signal ATIP), the subroutine SRVStartUp_1 also executes the macro RET to record the value of a constant bReadATIPPosition_Err in the error code _bErrorCode[1], and then terminates. If the subroutine bReadATIPPosition_4 successfully finished, the subroutine SRVStartUp_1 continues and invokes a second level subroutine bReadLeadin_2 for controlling the peripheral device 32 to retrieve the Lead-In Area from the optical disk 48C. If an error occurs when the peripheral device 32 executes the subroutine bReadLeadin_2 (such as the optical disk drive can not find the Lead-In Area), the subroutine executes the macro RET to set the value of the error code _bErrorCode[1] to the value of the constant bReadLeadin_Err, according to the return value of the subroutine bReadLeadin_2.

In other words, if an error occurs while the peripheral device 32 is executing the lower-level (lower than the first level) subroutines invoked by the subroutine SRVStartUp_1, the subroutine SRVStartUp_1 sets the value of the error code _bErrorCode according to the return value of these lower-level subroutines, to reflect the operational error correspondingly. And then the subroutine SRVStartUp_1 is terminated. On the other hand, as shown in FIG. 15, if the peripheral device 32 successfully finishes all the lower-level subroutines invoked by the subroutine SRVStartUp_1, after executing a subroutine MediaOklnitSetting_5 of the fifth level for setting the required parameters of the follow-up control of the peripheral device 32, the subroutine SRVStart Up_1 goes through to the program section 52B and records the value of the constant READY in the error code _bErrorCode[1], that represents that the subroutine SRVStartUp_1 has successfully entered standby, the value of the variable _bLevel is also reset to "0", and then the subroutine SRVStartUp_1 finishes.

Figure 18:
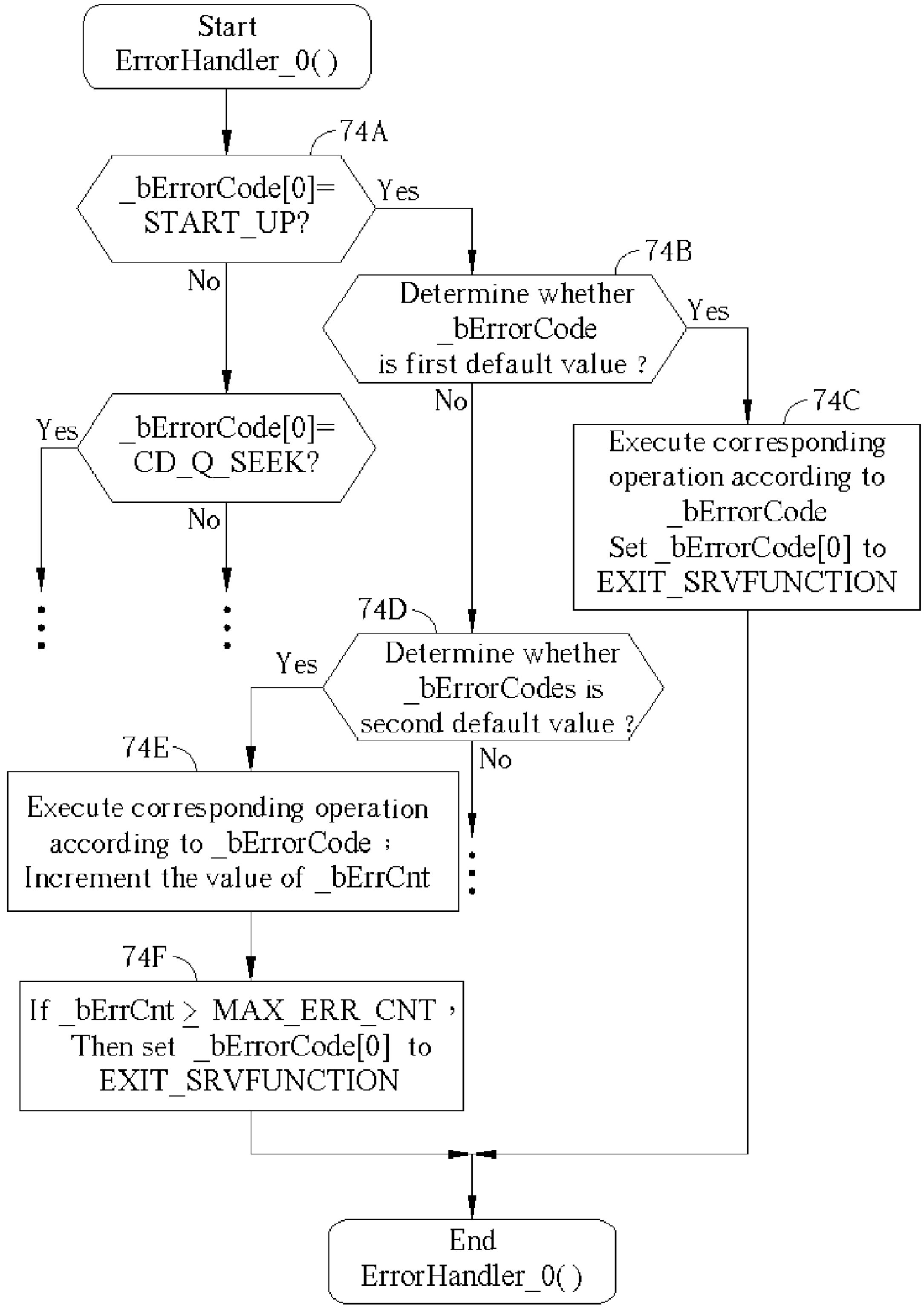
FIG. 18 is a flowchart of the execution flow of the error-handling subroutine of FIG. 16 and FIG. 17.

Please refer to FIG. 16 to FIG. 18. The combination of FIG. 16 and FIG. 17 is a code-listing embodiment of program code of the error-handling subroutine ErrorHandler_0, and FIG. 18 is a flowchart of the execution thereof. As shown in FIG. 16 and FIG. 17, the subroutine ErrorHandler_0 determines which subroutine of the first level execute the corresponding error recovery, according to the value of the error code _bErrorCode[0]. As in the subroutine SRVFunction_0 in FIG. 13 mentioned above, when the subroutine SRVFunction_0 invokes a first level subroutine, the first level subroutine is recorded in the error code _bErrorCode[0] as the value of a variable FuncName. When the subroutine ErrorHandler_0 is executed, it preliminarily classifies all the possible operational error of the first level subroutines according to the error code _bErrorCode[0].

In the case of different subroutines of the first level, the subroutine ErrorHandler_0 further defines corresponding error recovery according to the error code _bErrorCode[1]. As described in the code listing embodiment shown in FIG. 16 and FIG. 17, after the subroutine SRVStartUp_1 finishes (the corresponding error code _bErrorCode[0] is the value of a constant START_UP), the value of the error code _bErrorCode[1] is the value of one of the following constant READY, TRAY_EJECT, bReadQPosition_Err, bReadATIPPosition_Err, bReadLeadin_Err, and so on. As described in the subroutine SRVStartUp_1 shown in FIG. 15, if an operational error occurs when the peripheral device is executing lower-level subroutines invoked by the subroutine SRVStartUp_1, the value of the corresponding constant would be recorded in the error code _bErrorCode[1]. The subroutine ErrorHandler_0 finds the corresponding error recovery by using the value of the error code _bErrorCode[1] as an index. For example, as shown in FIG. 16 and FIG. 17, if the value of the error code Error_Code[1] is the value of the constant READY, this represents no error occurred while the peripheral device 32 was executing the subroutine SRVStartUp_1, and the subroutine ErrorHandler_0 records a value of the constant EXIT_SRVFUNCTION in the error code _bErrorCode[0], and records the value of the constant READY in a variable _bPlayerStatus as another error code that represents the peripheral device 32 successfully finished the subroutine SRVStartUp_1. Afterwards, the subroutine ErrorHandler_0 is terminated. On the other hand, if the value of the error code _bErrorCode[1] is the value of the constant TRAY_EJECT, this represents that the user pressed the "eject" button (refer to FIG. 15 and related elaborate) and the subroutine would not only set the value of the error code _bErrorCode, but also record the value of the constant TRAY_EJECT in the variable _bPlayerStatus, representing that the tray of the peripheral device 32 is ejected. Afterwards, the subroutine ErrorHandler_0 finishes.

Further, the lower-level subroutines invoked by the subroutine SRVStartUp_1 can invoke other subroutines of a lower level, and record more error information about the lower-level subroutines. For example, as in the program code shown in FIG. 17, when the value of the error code _bErrorCode[1] is the value of the constant bReadLeadin_Err, the subroutine ErrorHandler_0 further defines different recovery operations according to the value of the error code _bErrorCode[2] being the value of a constant bSeekATIP_Err, or a constant Read LeadinInfo_Err, etc. For instance, when the value of the error code _bErrorCode[2] is the value of the constant bSeek ATIP_Err, the subroutine ErrorHandler_0 further determines what recovery operations the peripheral device 32 should executes, according to the value of the error code _bErrorCode[3] such as the value of a constant FOCUS_ERROR or a constant READATIP_ERROR, etc. In other words, if the optical disk drive can not read the Lead-In Area of an optical disk (this corresponds to the constant bReadLeadin_Err), the reason is that the optical disk drive can not execute track seeking based on the signal ATIP, which corresponds to the constant bReadLeadin_Err, or the optical disk drive can not retrieve information from the Lead-In Area correctly, which corresponding to the constant ReadLeadininfo_Err. If the optical disk drive can not execute track seeking according to the signal ATIP, the reason further includes the optical disk drive can not focus the laser of the pick-up head on the optical disk correctly, which corresponds to the constant FOCUS_ERROR, or the optical disk drive can not retrieve the signal ATIP, which corresponds to the constant READATIP_ERROR, and so on. Thus, for various possible situations of operational errors, the corresponding error recovery operations are defined in the subroutine ErrorHandler_0 according to the present invention, so that it can unify the management of error recovery operations.

In addition to finding the corresponding error recovery operation according to the content of the error code in the subroutine ErrorHandler_0 as the discussion about FIG. 13 and FIG. 14 mentioned above, the subroutine ErrorHandler_0 can also control retry of the first level subroutines while the subroutine SRVFunction_0 is executing with the value of the error code _bErrorCode[0]. As in the program code shown in FIG. 16 and FIG. 17, in the situation without retry, the subroutine ErrorHandler_0 records the value of the constant EXIT_SRVFUNCTION in the error code _bErrorCode[0], and then finishes. For example, when the error code _bErrorCode[1] is the constant READY or the constant TRAY_EJECT, the first representing the subroutine SRVStartUp_1 successfully finished and that it is unnecessary to retry; the latter representing the user pressed the "eject" button so the operation of the peripheral device 32 has halted. As the flow shown in FIG. 13 and FIG. 14, for the situations unnecessary to retry, the subroutine SRVFunction_0 finishes after the subroutine ErrorHandler_0 is finished due to the error code Error_Code[0] being the value of the constant EXIT_SRVFUNCTION. And the interface program IF (see FIG. 12) returns the operational situation of the peripheral device 32 to the host 30 according to the value of the error code _bErrorCode or that of the variable _bPlayerStatus.

On the other hand, in the case that the error recovery operation needs to retry, the subroutine ErrorHandler_0 does not record the value of the constant EXIT_SRVFUNCTION in the error code _bErrorCode[0]. For example, as shown in FIG. 16, when the peripheral device 32 is under the control of the subroutine SRVFunction_0 and executes the subroutine ErrorHandler_0 after the first level subroutine SRVStartUp_1 is finished, if the error code ErrorCode[1] is the value of a constant bReadATIPPosition_Err, the subroutine ErrorHandler_0 controls the peripheral device 32 to execute a subroutine ServoOff_5 of the fifth level. The servo module 40C (see at FIG. 4) first halts, resets the variable _bPlayerStatus, and then increments the variable _bErrCnt by "1", wherein the initial value of the variable _bErrCnt should be "0" as shown in FIG. 13. As shown in FIG. 13 and FIG. 14, after the subroutine ErrorHandler_0 finishes, the subroutine SRVFunction_0 controls the peripheral device 32 to execute the subroutine SRVStartUP_1 again (it also retries) and then again goes through to the subroutine ErrorHandler_0 after finishing the subroutine SRVStartUp_1. This is because the error code _bErrorCode is not equal to the constant EXIT_SRVFUNCTION in the program instruction "while" of the subroutine SRVFunction_0. If no operational error occurred when retrying the subroutine SRVStartUp_1 (or the operational error is unnecessary to retry, such as when the user presses the "eject" button for example), for the second time to execute the subroutine ErrorHandler, the subroutine records the value of the constant EXIT_SRVFUNCTION in the error code _bErrorCode[0]. Then the subroutine SRVFunction breaks from the "do-while" instruction and terminates.

While the peripheral device 32 is executing a retry operation, if the subroutine ErrorHandler_0 needs to be executed due to an error requiring a retry (such as an operational error corresponding to the constant bReadATIPPosition_Err) occurring again for the second time executing the subroutine SRVStartUp_1, the subroutine ErrorHandler_0 does not set the value of the error code _bErrorCode[0] to the value of constant EXIT_SRVFUNCTION. Instead it increments the variable _bErrCnt by "1" when executing the corresponding error recovery. The variable _bErrCnt is used for controlling the number of retry times of the first level subroutines. Please notice that when the program code shown in FIG. 16 and FIG. 17 does not need to retry an operational error, the subroutine ErrorHandler_0 goes through to an instruction "return" after it sets the value of the error code _bErrorHandler_0 to the constant EXIT_SRVFUNCTION and then finishes execution. On the other hand, in the case that the error recovery needs to retry (such as the error code _bErrorCode[1] is the constant bReadATIPPosition_Err), the subroutine ErrorHandler goes through to program section 54 shown in FIG. 17 to check whether the value of the variable _bErrorCnt is greater than a constant MAX_ERR_CNT after accumulating the value of the variableErrCnt. If it is true, it represents that the number of retry times is too great and the subroutine ErrorHandler_0 records the value of the constant EXIT_SRVFUNCTION in the error code _bErrorCode[0] to force the SRVFunction to terminate when the firmware code execution flow go through to execute the subroutine SRVFunction_0. The interface program IF returning the situation of the peripheral device 32 can not operate normally after retrying many times to the host 30 according to the variables, such as error code etc. To summarize the execution of the subroutine ErrorHandler_0 in FIG. 18, first of all it searches the corresponding operational error, as in step 74A, according to the error code _bErrorCode[0]. If the value of the error code _bErrorCode corresponds to an operational error unnecessary to retry (it also includes the first default values such as when the error code _bErrorCode[1] is the value of the constant READY or the constant TRAY_EJECT), it goes through from step 74B to step 74C to execute the corresponding error recovery. After setting the error code _bErrorCode[0] to the constant EXIT_SRVFUNCTION, the subroutine ErrorHandler_0 finishes. IF the value of the error code _bErrorCode corresponds to an operational error necessary to retry (it also includes the second default values such as the error code _bErrorCode[1] being the value of the constant bReadQPosition_Err or the constant bReadATIPPosition_Err), it goes through from step 74D to step 74E, accumulates the value of the variable _bErrCnt after executing the corresponding error recovery according to the error code _bErrorCode, and checks whether the value of the variable _bErrCnt is greater than the default constant MAX_ERR_CNT in step 74F to control the number of retries.

In summary, the present invention classifies all the subroutines of a firmware code into various levels, where the lower-level subroutines are used for defining the simpler and more single-function operations and the higher-level subroutines are used for calling the lower-level subroutines to define more complex and more complete operations. Between all subroutines, a one-way invoking principle is used for maintaining the order of calling between subroutines, the lower-level subroutines are not allowed to call the higher-level subroutines, and subroutines of the same level are not allowed to call each other (except subroutines of the lowest level). Additionally, the present invention further disclose a principle of unifying the handling of error recovery that uses an error code to record that an operational error occurred when a peripheral device executes subroutines of various levels. An error-handling subroutine is used for unifying the controlling of the peripheral device to execute corresponding error recovery operations according to the error code. Due to the prior art lacking management when subroutines of the firmware code invoke each other, the prior art forms complex series executions between subroutines (meaning while a subroutine is executing, another subroutine finishes first). Not only does this reduce the ability to trace the execution flow, complicate the debug, and decrease the readability of the code, it also consumes considerable resources of the processor while executing. When executing the corresponding error recovery in the prior art, it causes unnecessarily repeated error recovery and incorrect or incomplete recovery due to the complex execution flow and lack of management. In contrast with the prior art, the one-way invoking principle of the present invention maintains the simplicity of execution flow so that the number of series executions is effectively controlled. Not only does this make the firmware code easier to read, easier to manage, easier to trace, easier to debug, it also reduces the required resources of the processor while the peripheral device is executing the firmware code. Additionally, the error-handling subroutine is used for integrating various corresponding error recovery operations according to the error code unifying and managing all of the error recovery to avoid the unnecessarily repeated error recovery, and also to ensure correctness of the error recovery. Due to the one-way invoking principle of the present invention together with the operational results of subroutines of various levels already recording the error code, it could be regarded as the execution flow and operational results are recorded in the error code. No matter whether debugging and developing the firmware, or trouble shooting the peripheral device, the firmware code engineer can easily debug and trouble shoot according to the information recorded in the error code. Although a peripheral device interfaced with a host is used throughout the detailed description of the preferred embodiment, this is for example only. Independent electronic devices such as mobile phones and digital cameras are also supported by the present invention to effectively manage the structure of the firmware code thereof. In the firmware code, the principle of the present invention could be used to implement both the interface program and the servo program; in other words, the subroutines of the interface program could be classified into different levels and could also establish an error-handling subroutine belonging to the interface program.

Those skilled in the art will readily observe that numerous modifications and alterations of the device may be made while retaining the teachings of the invention. Accordingly, that above disclosure should be construed as limited only by the metes and bounds of the appended claims.

What is claimed is:

1. A method for controlling a hardware circuit with a processor, the processor used for executing a program code to control the hardware circuit, the program code comprising:

a plurality of lower-level subroutines, wherein after the processor executes various lower-level subroutines, the hardware circuit will be controlled to execute various corresponding operations, and each the lower-level subroutine will record operation results, which come from the hardware circuit executing corresponding operations, in an error code; wherein each operation result corresponds to a recovery operation;

a plurality of higher-level subroutines, each higher-level subroutine used for calling at least a lower-level subroutine to control the hardware circuit to execute operations corresponding to the lower-level subroutine called by the higher-level subroutine when the processor executes the higher-level subroutine;

a plurality of recovery subroutines, each recovery subroutine corresponding to a recovery operation, wherein the hardware circuit is controlled to execute various corresponding recovery operations after the processor executes various recovery subroutines; and an error-handling subroutine for calling the recovery subroutines according to the error code;

the method comprising:

after the processor executes the higher-level subroutine, executing the error-handling subroutine to allow the processor to control the hardware circuit to execute recovery operations according to the operation results corresponding to the lower-level subroutine called by the higher-level subroutine.

2. The method of claim 1, wherein when the processor executes the error-handling subroutine after the higher-level subroutine is executed, the processor will not execute the recovery operations corresponding to the lower-level subroutine called by the higher-level subroutine until the higher-level subroutine is finished.

3. The method of claim 1, wherein the higher-level subroutines won't call each other so that a next higher-level subroutine will not be executed until the processor finishes executing a previous higher-level subroutine.

4. The method of claim 1, wherein the hardware circuit is a servo module of an optical storage drive, the servo module comprising:

a motor for driving an optical disk to rotate; and a pick-up head for generating a laser incident on the optical disk.

5. The method of claim 1, wherein the hardware circuit is an interface module of an optical storage drive.

6. The method of claim 1, wherein the error code is a global variable of the program code; the operation results corresponding to the lower-level subroutines will be recorded in the same error code.

7. The method of claim 1, wherein the program code further comprises a plurality of next-level subroutines; when the processor executes various next-level subroutines, the hardware circuit is controlled to execute corresponding operations; each next-level subroutine will record operation results corresponding to the hardware circuit in a second error code; each lower-level subroutine is used for calling at least a next-level subroutine so that the processor executes the next-level subroutine called by the lower-level subroutine to control the hardware circuit to execute corresponding operations when executing the lower-level subroutine.

8. The method of claim 7, wherein next-level subroutines called by each lower-level subroutine record corresponding operation results in the same second error code.

9. The method of claim 7, wherein the second error code is a column of the error code.

10. The method of claim 7, wherein the next-level subroutines record corresponding operation results in the same second error code.

11. The method of claim 1, wherein the lower-level subroutines won't call each other so that a next lower-level subroutine will not be executed until the processor finishes executing a previous lower-level subroutine.

12. The method of claim 1, wherein the lower-level subroutines won't call the higher-level subroutines.

13. The method of claim 1, wherein the error-handling subroutine unifies and manages recovery operations of all subroutines included in the program code, except the error-handling subroutine.

14. An electronic device, comprising:

a hardware circuit for achieving operations of the electronic device;

a processor for executing a program code to control the hardware circuit;

a storage device for storing the program code; wherein the program code comprises:

a plurality of lower-level subroutines, wherein after the processor executes various lower-level subroutines, the hardware circuit will be controlled to execute various corresponding operations, and each lower-level subroutine will record operation results, which come from the hardware circuit executing corresponding operations, in an error code; wherein each operation result corresponds to a recovery operation;

a plurality of higher-level subroutines, each higher-level subroutine used for calling at least a lower-level subroutine to control the hardware circuit to execute operations corresponding to the lower-level subroutine called by the higher-level subroutine when the processor executes the higher-level subroutine;

a plurality of recovery subroutines, each recovery subroutine corresponding to a recovery operation, wherein the hardware circuit is controlled to execute various corresponding recovery operations after the processor executes various recovery subroutines; and an error-handling subroutine for calling the recovery subroutines according to the error code;

wherein after executing the higher-level subroutine, the processor executes the error-handling subroutine to allow the processor to control the hardware circuit to execute recovery operations according to the operation results corresponding to the lower-level subroutine called by the higher-level subroutine.

15. The electronic device of claim 14, wherein when the processor executes the error-handling subroutine after the higher-level subroutine is executed, the processor will not execute the recovery operations corresponding to the lower-level subroutine called by the higher-level subroutine until the higher-level subroutine is finished.

16. The electronic device of claim 14, wherein the higher-level subroutines won't call each other so that a next higher-level subroutine will not be executed until the processor finishes executing a previous higher-level subroutine.

17. The electronic device of claim 14 being an optical storage drive, the hardware circuit comprising a servo module, which comprising:

a motor for driving an optical disk to rotate; and a pick-up head for generating a laser incident on the optical disk.

18. The electronic device of claim 14 being an optical storage drive, the hardware circuit being an interface module of the optical storage drive.

19. The electronic device of claim 14, wherein the error code is a global variable of the program code; the operation results corresponding to the lower-level subroutines will be recorded in the same error code.

20. The electronic device of claim 14, wherein the program code further comprises a plurality of next-level subroutines; when the processor executes various next-level subroutines, the hardware circuit is controlled to execute corresponding operations; each next-level subroutine will record operation results corresponding to the hardware circuit in a second error code; each lower-level subroutine is used for calling at least a next-level subroutine so that the processor executes the next-level subroutine called by the lower-level subroutine to control the hardware circuit to execute corresponding operations when executing the lower-level subroutine.

21. The electronic device of claim 20, wherein next-level subroutines called by each lower-level subroutine record corresponding operation results in the same second error code.

22. The electronic device of claim 20, wherein the second error code is a column of the error code.

23. The electronic device of claim 20, wherein the next-level subroutines record corresponding operation results in the same second error code.

24. The electronic device of claim 14, wherein the lower-level subroutines won't call each other so that a next lower-level subroutine will not be executed until the processor finishes executing at previous lower-level subroutine.

25. The electronic device of claim 14, wherein the lower-level subroutines won't call the higher-level subroutines.

26. The electronic device of claim 14, wherein the error-handling subroutine unifies and manages recovery operations of all subroutines included in the program codes, except the error-handling subroutine.

* * * * *